(12) United States Patent
Swanson, Sr.

(10) Patent No.: US 7,337,947 B1
(45) Date of Patent: Mar. 4, 2008

(54) PREPAID ACCOUNT AND CARD

(75) Inventor: Daniel Raymond Swanson, Sr., Midlothian, VA (US)

(73) Assignee: Capitol One Financial Corporation, McLean, VA (US)

( * ) Notice: Subject to any disclaimer, the term of this patent is extended or adjusted under 35 U.S.C. 154(b) by 0 days.

(21) Appl. No.: 11/170,827

(22) Filed: Jun. 30, 2005

(51) Int. Cl.
G06F 17/00 (2006.01)
G06F 7/08 (2006.01)
G07F 19/00 (2006.01)
G06K 5/00 (2006.01)
G06Q 40/00 (2006.01)

(52) U.S. Cl. ............... 235/375; 235/379; 235/380; 235/381; 705/35; 705/39

(58) Field of Classification Search ........... 235/375, 235/379, 380–382; 705/39, 41, 17, 35
See application file for complete search history.

(56) References Cited

U.S. PATENT DOCUMENTS

| | | | |
|---|---|---|---|
| 4,837,422 A * | 6/1989 | Dethloff et al. ......... | 235/380 |
| 5,819,234 A * | 10/1998 | Slavin et al. ......... | 340/10.4 |
| 5,969,316 A | 10/1999 | Greer et al. | |
| 5,991,748 A * | 11/1999 | Taskett ............ | 705/41 |
| 2002/0022966 A1 | 2/2002 | Horgan | |
| 2002/0161705 A1 | 10/2002 | Khan et al. | |
| 2002/0174016 A1 | 11/2002 | Cuervo | |
| 2003/0105711 A1 | 6/2003 | O'Neil | |
| 2003/0208439 A1 | 11/2003 | Rast | |
| 2003/0208445 A1 | 11/2003 | Complano | |
| 2004/0093303 A1 | 5/2004 | Picciallo | |
| 2004/0211830 A1 | 10/2004 | Algiene | |
| 2005/0125317 A1 * | 6/2005 | Winkelman et al. ..... | 705/30 |

* cited by examiner

Primary Examiner—Thien M. Le
Assistant Examiner—April A. Taylor
(74) Attorney, Agent, or Firm—Baker & McKenzie LLP

(57) ABSTRACT

A transaction card with a prepaid amount for spending is disclosed. The card may be funded through direct deposit, savings accounts, or any other source, for instance, specified by an individual setting up the transaction card. The card may be reloaded or reissued with more money on a periodic basis, for example, to control spending per period. Balances remaining on the card at the end of the period may be returned into a savings account or other accounts, as may be specified by the individual who set up the card or other authorized persons. The card may be set up to include a protection against overdraft, for instance, the card user may be allowed to spend ten percent more than the amount prepaid on the card.

11 Claims, 2 Drawing Sheets

PREPAID ACCOUNT AND CARD

TECHNICAL FIELD

This application relates generally to financial accounts and transaction devices such as cards, tokens, biometric devices, etc., and more particularly to a transaction card with prepaid amount for spending.

BACKGROUND

Debit cards are widely used today in payment transactions throughout the world. Prepaid cards such as prepaid debit or gift cards store a fixed amount of value on the cards for use. When the card is used to purchase goods and services, the cost of those goods and services is debited from the account up to the monetary sum stored in the card. Such cards are typically associated with an account maintained at a financial institution that issued the card. Prior to using the card for purchasing goods and services from a seller or merchant, a user typically deposits or stores a sum of money into the account associated with the card.

In some cases, the prepaid cards may be set up to store a fixed amount of value on a limited periodic basis, for instance, to have periodic limits such as weekly limits. In other cases, no time limits are imposed on the cards. That is, a user may hold onto the card and use the value amount stored in the card for goods and services until all the value is depleted. Yet in other cases, financial institutions issuing the card impose a time limit for usage, for example, one year, after which surcharge is subtracted from the value amount stored in the card. In all these cases, the user or the holder of the prepaid card has no recourse but to use up all the value left on the card.

SUMMARY

System and method for prepaid account and card are provided. In one aspect, the prepaid account and card system includes a processing system operable to withdraw a predetermined amount of funds on a predetermined periodic basis from one or more source accounts. The processing system is further operable to deposit the predetermined amount of funds withdrawn from the one or more source accounts to a prepaid card for spending and to transfer an unused balance on the prepaid card to one or more return accounts at the end of a predetermined period.

In another aspect, the one or more source accounts may include savings accounts, checking account, credit account, direct deposit, or combinations thereof. The one or more return accounts may include savings accounts, checking account, credit account, direct deposit, or combinations thereof. In yet another aspect, the one or more source account and the one or more return accounts are the same. Still yet, the processing system may allocate an additional amount of stored value on the prepaid card to cover overspending. For instance, a predetermined amount for overdraft protection may be provided.

A method for prepaid account and card in one aspect includes receiving information associated with one or more source accounts, creating a prepaid card having a predetermined amount of funds to spend in a predetermined period of time, the predetermined amount of funds supplied from one or more source accounts, returning unused balance on the prepaid card to one or more return accounts at the end of the predetermined period of time, and recharging the prepaid card on a periodic basis.

The method may further include receiving configuration data from a customer setting up the prepaid card, the configuration data including at least the predetermined amount of funds, the one or more source accounts from which the funds are supplied, and the one or more return accounts to which the unused balance is returned.

In another aspect, the recharging of the prepaid card may include reissuing a new prepaid card on a periodic basis. The recharging the prepaid card may include transferring additional amount of funds to the existing prepaid card. For recharging the prepaid card, a sticker with the recharged amount may be sent to the user of the prepaid card. Yet in another aspect, the method may include providing a protection for overspending on the prepaid card such as allowing a user to spend more than a stored value amount on the prepaid card.

Further features as well as the structure and operation of various embodiments are described in detail below with reference to the accompanying drawings. In the drawings, like reference numbers indicate identical or functionally similar elements.

DETAILED DESCRIPTION

Figure 1:
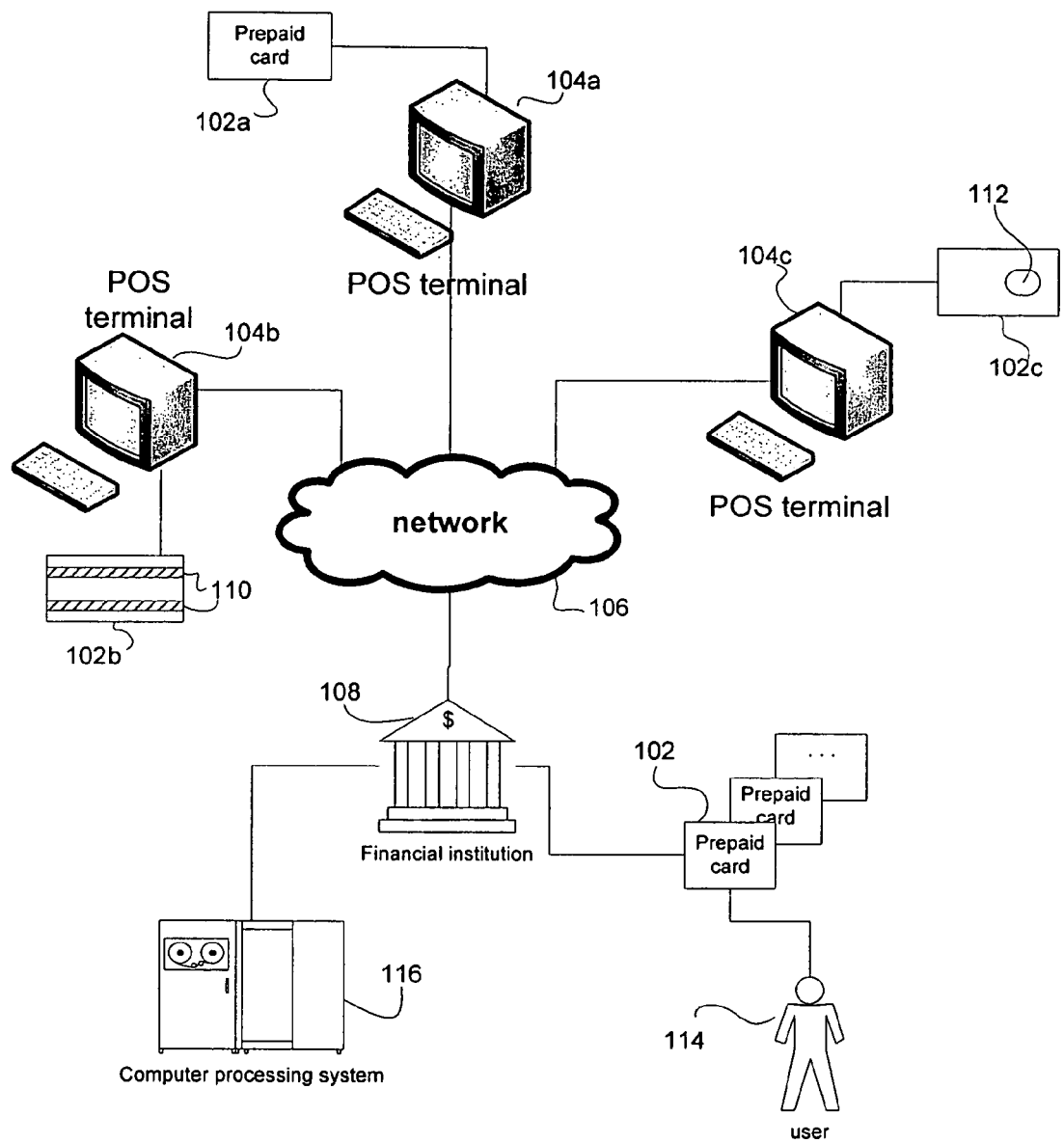
FIG. 1 illustrates a prepaid card system in one embodiment.

A system and method for prepaid account and card is disclosed. FIG. 1 illustrates a prepaid card system in one embodiment. A user through a financial institution 108 may set up an account and create a prepaid card 102, for instance, to send to a third party 114 or even for the user's own use. The user may fund the prepaid card 102 through direct deposit and instruct the financial institution, for example, to send the prepaid card 102 to a designated user 114 at one or more designated timeframes. Such an arrangement, for example, would help people limit their spending, for instance, to stay within their budget. The prepaid cards 102 may be set up so that it can be used for general spending, food, hobbies, or other specific uses.

The user, typically a customer of an entity such as a bank or other financial institution, setting up the prepaid card may also specify that a prepaid card 102 be funded from one or more source accounts such as saving, checking, other bank accounts, or even from a credit card account. For instance, an entity 108 such as a financial institution can create a prepaid card account and fund that account on a periodic basis as specified by the user from different source accounts also as specified by the user. At the end of each period, the sum remaining on the prepaid card can be returned to the account and the prepaid card 102 reactivated with a specified amount of money.

The entity 108 shown in FIG. 1 is not limited to a financial institution only, but can be any entity including but not limited to a bank, credit union, credit card issuer, brokerage, and/or a provider of other financial services. The entity 108 may provide various services, including managing and maintaining customer accounts, processing transaction information, facilitating fund transfers, extending lines of credit, transferring payments for transactions performed by an individual, and facilitating settlement processes associated with inter-institutional transactions.

The entity 108 also may include functionalities associated with Automated Clearing House ("ACH") systems, Electronic Funds Transfer ("EFT") systems, Automated Teller Machine ("ATM") systems, credit-card networks, and the like. Alternatively, the entity 108 may be affiliated with or otherwise associated with those entities that perform such functions.

Tracking of the accounts associated with prepaid cards may be accomplished in several different ways. In one commonly used method, a host computer system 116 can include one or more computer platforms and tracks all transactions involving the prepaid card. The host computer system 116 can be part of the card-issuing financial institution 108 or a separately maintained system with which the financial institution 108 has an agreement. When the prepaid cards 102a, 102b, 102c are used, various retail points of sale terminals 104a, 104b, 104c can communicate the debit as well as activation transactions to the host computer of the financial institution 108, for instance, via a network 106. The card issuing financial institution 108 can have a network of point-of-sale devices that communicate the transactions occurring associated with the prepaid cards 102a, 102b, 102c with the card issuer's host computer systems 116. For instance, processing the prepaid cards 102a, 102b, 102c through the point-of-sale terminals 104a, 104b, 104c causes the terminals 104a, 104b, 104c to transmit messages over the network to the host computer system 116 associated with the financial institution 108. The messages inform the financial institution 108 to activate, credit or debit the prepaid account and thus activate the prepaid cards 102a, 102b, 102c for use, increase or decrease the value stored in the prepaid cards 102a, 102b, 102c.

The point-of sale terminals 104a, 104b, 104c may include computer terminals located at a merchant site such as a retail outlet, a retail location in the form of a virtual retail location, for example, on a web page accessible on a public communication network such as the Internet. These point-of sale terminals 104a, 104b, 104c typically include prepaid card reading devices for reading information stored on and/or data transmitted by the prepaid cards 102a, 102b, 102c. These point-of sale terminals 104a, 104b, 104c also may include an automated teller machine ("ATM"), a cash register, and the like, and may include a display device and a printing device for presenting information to the individual at the time of the transaction.

As will be apparent to those skilled in the art, the prepaid cards 102a, 102b, 102c may have one or more magnetic stripes 110, a microprocessor capable of storing and communicating information 112, any other device that could be affixed on a transaction card, such as a RFID chip or antenna or any combination thereof for storing information. Also as will be apparent to those skilled in the art, the information may include any data associated with the usage of the card such as the value amount, the user information, and other account information, for instance, that identify transaction account number information, account managing entity identification information, transaction routing information, and the like. The prepaid card may optionally store information relating to the individual, such as individual identification information, individual demographic information, additional financial account information, and the like.

This system is useful, for example, to budget expenses for a family while allowing for the convenience of a debit or other transaction card. The system is also useful for providing funds to a third party on a periodic basis. This system offers a convenient mechanism for a consumer to fund a prepaid account and then use that account to help them or a third party stay within the spending limits because, for instance, when the stored value reaches zero balance, no more spending can occur. Any remaining balance at the end of the period will be returned to the account of the user's choice, further providing means to save and budget.

In another embodiment, the account holder can establish a financial pad in the prepaid card, for instance, to safeguard against overspending. For example, the user of the prepaid card may be allowed to spend up to $110 when the balance remaining is $100. The amount of the pad or protection, obviously could be a choice made either by the customer setting up the prepaid account or the financial institution and can be a set percentage of the total stored value or the like.

Figure 2:
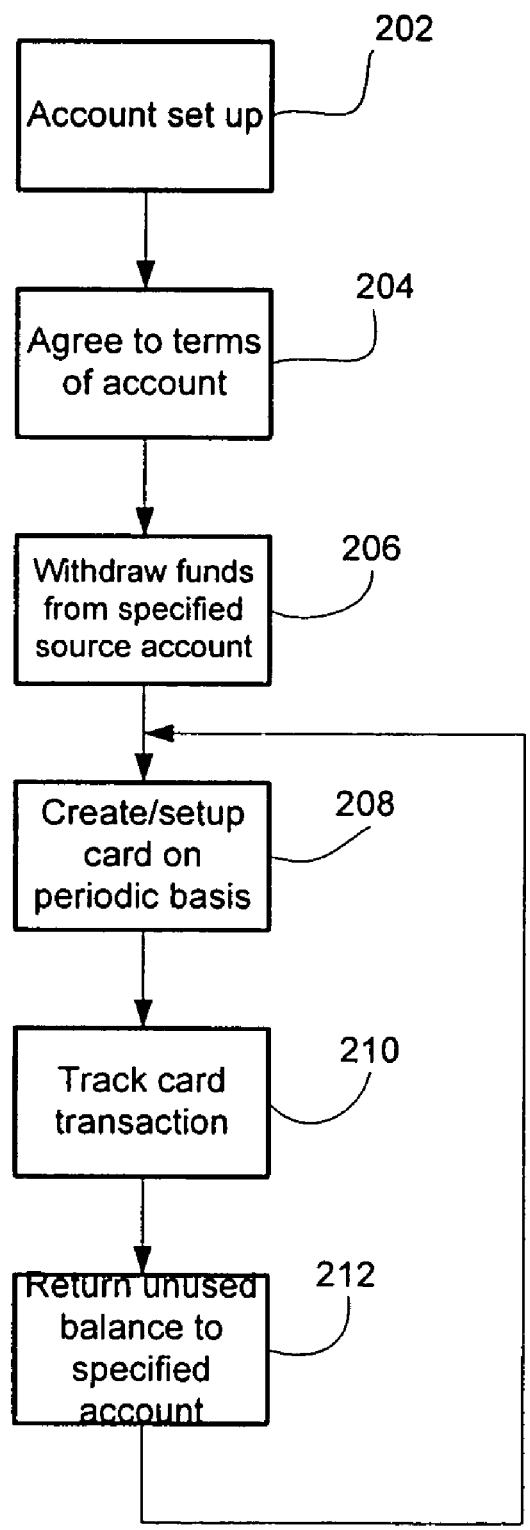
FIG. 2 is a flow diagram illustrating the method for prepaid account and card in one embodiment.

FIG. 2 is a flow diagram illustrating the method for prepaid account and card in one embodiment. At 202, an individual makes a request to a financial institution to set up a prepaid account and card. The individual can direct that the account be set up to have a predetermined amount of money on a periodic basis. The deposits to the account may be in the form of direct deposit or from other sources such as balance transfer, annuity payment, and other accounts. Thus, for example, withdrawals from such accounts can be made automatically on a periodic basis such as weekly, monthly, etc., that is specified by the individual. The individual can also specify who may receive and use the prepaid card associated with the account. At 204, the individual agrees to the terms of the account. At 206, according to the terms of the account and the individual's directions, the financial institution on a periodic basis withdraws funds from the specified one or more source accounts and deposits in the prepaid account. The source accounts may be any type of account elected by the individual, and may include savings accounts, checking accounts, credit accounts, money market account, etc. In addition, if the prepaid account is to be funded using direct deposit, the financial institution may send a notice for direct payment to the individual on similar periodic basis.

At 208, on the specified periodic basis, the financial institution creates a prepaid card with the fixed amount of money value and sends the prepaid card to the recipient or the user as specified by the individual who arranged the account. In another embodiment, a renewed or recharged sticker may be sent in lieu of a physical card. The user or the holder of the card then may affix the sticker to the exiting prepaid card. Alternatively, after initially creating the prepaid card, the card can be renewed or recharged on a periodic basis with the sum of money. The recharging can be performed, for instance, by transmitting the recharge or renewed information to the prepaid card. For example, the holder of the prepaid card can use a processing unit such as an ATM or the like that is associated with the financial institution to recharge the card.

At 210, the financial institution tracks the usage of the prepaid card, for instance, through a network of financial processing infrastructure. The details of tracking are known to those skilled in the art and will not be explained in detail herein. Generally, when a user uses the prepaid card to make a purchase or the like at a point-of-sales terminal or the like, the point-of-sales terminal or the like communicates the amount of money spent to the financial institution or its data processing affiliates via a network, so that the amount can be debited from the prepaid account.

At the end of each period specified by the individual who arranged the prepaid account, the financial institution can then process the remaining balance on the account as well as performing any other functions related to the prepaid account. At 212, the unused balance is returned to an account, for example, of the individual's choice. The return account, for example, may have been specified by the individual when the prepaid account was first arranged. For instance, the individual may have specified that the unused balance be returned to a savings account, checking account, or the like or be apportioned among two or more accounts specified by the individual. Alternatively, the individual may have specified that the unused balance be returned to the individual, in which case, an amount in the form of a check, money order, a balance transfer, an ACH, or the like can be sent to the individual.

During the term of the account, the individual may have an option to alter any specification that he or she set up initially. For instance, the individual may change the source account from which to fund the prepaid account, the periodic basis within which the money in the card should be used, the amount of money per period, etc.

In one embodiment, the prepaid account and card may be set up to include a protection against overdraft. That is, the card user may be allowed to spend a specified amount more than the actual amount prepaid on the card. The specified amount, for instance, can be the choice of the account owner, the financial institution, or any other authorized persons and can be a percentage of the initial prepaid value stored on the card or a fixed sum.

It should be understood that although the prepaid card was explained and illustrated in FIG. 1 (102) as a physical card, the concept of a prepaid card may be in any other form. Thus, the present disclosure contemplates a prepaid card in a form of a virtual card, for instance, that transmits and stores information related to the prepaid account to any devices capable of receiving and storing such information and capable of such usage. Such devices may include but is not limited to any electronic devices such as personal digital assistants (PDAs), cellular phone, etc.

The apparatus and method of the present disclosure may be implemented and run on a general-purpose computer. The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A computer-implemented prepaid account and card system, comprising:
   a processing system operable to withdraw a predetermined amount of funds on a predetermined periodic basis from one or more source accounts, the processing system further operable to deposit the predetermined amount of funds withdrawn from the one or more source accounts to a prepaid card for spending, to transfer an unused balance on the prepaid card to one or more return accounts at an end of a predetermined period, to recharge the prepaid card on a predetermined periodic basis, and to allocate an additional amount of stored value on the prepaid card to allow a user to spend more than a stored value amount on the prepaid card, wherein
   recharging the prepaid card includes reissuing a new prepaid card on a periodic basis.

2. The system of claim 1, wherein
   the one or more source accounts include savings accounts, checking account, an annuity account, a trust account, an insurance account, credit account, direct deposit, or combinations thereof.

3. The system of claim 1, wherein
   the one or more source account and the one or more return accounts are the same.

4. The system of claim 1, wherein
   the one or more return accounts include savings accounts, checking account, an annuity account, a trust account, an insurance account, credit account, direct deposit, or combinations thereof.

5. A method of issuing and managing a prepaid account and card system, comprising:
   receiving information associated with one or more source accounts;
   creating a prepaid card having a predetermined amount of funds to spend in a predetermined period of time, the predetermined amount of funds supplied from one or more source accounts;
   returning an unused balance on the prepaid card to one or more return accounts at the end of the predetermined period of time;
   recharging the prepaid card on a predetermined periodic basis; and
   providing a protection for overspending on the prepaid card, wherein
   the recharging the prepaid card includes reissuing a new prepaid card on a periodic basis; and
   the providing a protection includes allowing a user to spend more than a stored value amount on the prepaid card.

6. The method of claim 5, further including:
   receiving configuration data from a customer setting up the prepaid card, the configuration data including at least the predetermined amount of funds, the one or more source accounts from which the funds are supplied, and the one or more return accounts to which the unused balance is returned.

7. The method of claim 5, wherein
   the recharging the prepaid card includes transferring additional amount of funds to the prepaid card.

8. The method of claim 5, wherein
   the recharging the prepaid card includes providing a prepaid sticker with renewed amount.

9. A program storage device readable by machine, tangibly embodying a program of instructions executable by the machine to perform a method of issuing and managing a prepaid account and card system, comprising:
   receiving information associated with one or more source accounts;
   creating a prepaid card having a predetermined amount of funds to spend in a predetermined period of time, the predetermined amount of funds supplied from one or more source accounts;
   returning unused balance on the prepaid card to one or more return accounts at the end of the predetermined period of time;
   recharging the prepaid card on a periodic basis; and
   providing a protection for overspending on the prepaid card, wherein
   the providing a protection includes allowing a user to spend more than a stored value amount on the prepaid card.

10. The program storage device of claim 9, further including:
    receiving configuration data from a customer setting up the prepaid card, the configuration data including at least the predetermined amount of funds, the one or more source accounts from which the funds are supplied, and the one or more return accounts to which the unused balance is returned.

11. The program storage device of claim 9, wherein
    the recharging the prepaid card includes transferring additional amount of funds to the prepaid card.

* * * * *

UNITED STATES PATENT AND TRADEMARK OFFICE
CERTIFICATE OF CORRECTION

PATENT NO. : 7,337,947 B1
APPLICATION NO. : 11/170827
DATED : March 4, 2008
INVENTOR(S) : Daniel Raymond Swanson, Sr.

It is certified that error appears in the above-identified patent and that said Letters Patent is hereby corrected as shown below:

On the title page, item:

(73) Assignee: please delete "Capitol" and substitute -- Capital --.

Signed and Sealed this

Thirty-first Day of March, 2009

JOHN DOLL
*Acting Director of the United States Patent and Trademark Office*